United States Patent
Sun et al.

(10) Patent No.: US 12,467,560 B2
(45) Date of Patent: Nov. 11, 2025

(54) HIGH-STRENGTH AND HIGH-TOUGHNESS BAINITE GEOLOGICAL DRILLING PIPE AND MANUFACTURING METHOD THEREFOR

(71) Applicant: BAOSHAN IRON & STEEL CO., LTD., Shanghai (CN)

(72) Inventors: Wen Sun, Shanghai (CN); Yaoheng Liu, Shanghai (CN); Zhonghua Zhang, Shanghai (CN); Ping Hu, Shanghai (CN); Yannan Ma, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 56 days.

(21) Appl. No.: 18/547,172

(22) PCT Filed: Feb. 25, 2022

(86) PCT No.: PCT/CN2022/077848
§ 371 (c)(1),
(2) Date: Aug. 21, 2023

(87) PCT Pub. No.: WO2022/179595
PCT Pub. Date: Sep. 1, 2022

(65) Prior Publication Data
US 2024/0133490 A1   Apr. 25, 2024
US 2024/0229979 A9   Jul. 11, 2024

(30) Foreign Application Priority Data
Feb. 25, 2021   (CN) .......................... 202110213765.3

(51) Int. Cl.
*F16L 9/02* (2006.01)
*C21D 1/84* (2006.01)
(Continued)

(52) U.S. Cl.
CPC .................. *F16L 9/02* (2013.01); *C21D 1/84* (2013.01); *C21D 6/005* (2013.01); *C21D 6/008* (2013.01);
(Continued)

(58) Field of Classification Search
None
See application file for complete search history.

(56) References Cited

FOREIGN PATENT DOCUMENTS

| CN | 1265711 | 9/2000 |
|---|---|---|
| CN | 101658879 A | 3/2010 |

(Continued)

OTHER PUBLICATIONS

Machine translation of JP 2003342687A, translated via EPO on Dec. 16, 2024 (Year: 2003).*

(Continued)

*Primary Examiner* — Elizabeth Collister
(74) *Attorney, Agent, or Firm* — Elizabeth L. Neal; DeWitt LLP

(57) ABSTRACT

The present disclosure provides a bainite geological drilling pipe, comprising the following chemical elements in percentage by mass: 0.14-0.22% of C, 0.2-0.55% of Si, 2.1-2.9% of Mn, 0.01-0.04% of Nb, 0.015-0.04% of Al, 0.001-0.005% of B, 0<N≤0.007%, with the balance being Fe and inevitable impurities, wherein a content ratio of Al to N is Al/N≥3. In addition, the present disclosure further provides a manufacturing method for the bainite geological drilling pipe, comprising the following steps: (1) performing smelting and casting on molten steel to obtain a pipe blank; (2) performing heating, piercing, continuous rolling and sizing on the pipe blank to obtain a pipe body; and (3) performing two-stage air cooling on the pipe body; in first-stage air cooling, performing air circular blowing cooling on the outer surface of the pipe body, the temperature before (Continued)

cooling is greater than or equal to Ar/3+50° C., the cooling rate is 5-15° C./s, and cooling to a temperature range from Bs-100° C. to Bs-50° C.; in second-stage air cooling, performing natural air cooling on the pipe body, the cooling rate is 0.5-4° C./s.

13 Claims, 1 Drawing Sheet

(51) Int. Cl.

| | | |
|---|---|---|
| *C21D 6/00* | (2006.01) | |
| *C21D 8/10* | (2006.01) | |
| *C21D 9/08* | (2006.01) | |
| *C22C 33/04* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |

(52) U.S. Cl.
CPC ............ *C21D 8/105* (2013.01); *C21D 9/085* (2013.01); *C22C 33/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C21D 2211/002* (2013.01)

(56) References Cited

FOREIGN PATENT DOCUMENTS

| | | |
|---|---|---|
| CN | 105907937 A | 8/2016 |
| CN | 109112427 A | 1/2019 |
| JP | S5315214 A | 2/1978 |
| JP | H09184014 A | 7/1997 |
| JP | 2001259712 A | 9/2001 |
| JP | 2003342687 A | 12/2003 |
| JP | 2009263715 A | 11/2009 |
| JP | 6455650 B1 | 1/2019 |
| KR | 20170074285 A | 6/2017 |

OTHER PUBLICATIONS

Machine translation from EPO of CN 109112427A, translated Feb. 19, 2025. (Year: 2019).*

Verhoeven, John D.. (2007). Steel Metallurgy for the Non-Metallurgist. Chapter 8, ASM International. Retrieved from <br>https://app.knovel.com/hotlink/toc/id:kpSMNM0003/steel-metallurgy-non/steel-metallurgy-non, pp. 71-82 (Year: 2007).*

International Search Report issued May 25, 2022, in connection with international application No. PCTCN2022/077848 from the China National Intellectual Property Administration.

First Search Report issued Oct. 26, 2022, in connection with corresponding CN Patent Application No. 202110213765.3 from the Chinese Patent Office.

First Office Action issued 2022, in connection with corresponding CN Patent Application No. 202110213765.3 from the Chinese Patent Office.

Office Action received for related Japanese Patent Application No. 2023-551208, mailed on Sep. 24, 2024, from the Japanese Patent Office, 12 pages (7 pages of English translation and 5 pages of official copy).

* cited by examiner

HIGH-STRENGTH AND HIGH-TOUGHNESS BAINITE GEOLOGICAL DRILLING PIPE AND MANUFACTURING METHOD THEREFOR

CROSS-REFERENCE TO RELATED APPLICATIONS

The present application is the U.S. National Stage application of International Application No. PCT/CN2022/077848, filed Feb. 25, 2022, which International Application was published on Sep. 1, 2022, as International Publication No. WO2022/179595. The International Application claims priority to Chinese Patent Application No. 202110213765.3, filed Feb. 25, 2021, the contents of which are incorporated herein by reference in their entireties.

TECHNICAL FIELD

The present disclosure relates to a seamless steel pipe and a manufacturing method therefor, in particular to a geological drilling pipe and a manufacturing method therefor.

BACKGROUND

In recent years, due to gradual mining out of shallow mineral resources, China has proposed strategies such as "three depths and one land" and "deep-sea drilling and maritime power". Geological drilling began to gradually develop towards large aperture and depth. This development trend will lead to drilling pipes bearing increasingly severe tensile force, pressure, bending force, torsional force, impact force, friction and other complex stresses during service, the drilling pipes are very prone to being subjected to problems of deformation, fracture and wear failure caused by overload, resulting in high accident handling costs and low drilling efficiency. Therefore, it is urgent to develop drilling pipe products with higher performance, so as to meet the development demands of the industry.

At present, traditional geological drilling pipe products are no longer able to meet the demands of development towards depth in the geological industry. In order to achieve geological drilling pipe products with higher levels, it is necessary to adopt a Cr—Mo steel grade subjected to quenching and tempering heat treatment. As for such method in the prior art, not only the alloy and process costs are high, but also the heat treatment procedure is limited to environmental protection requirements, thus many users do not have the production conditions; and there are problems such as prone deformation and cracking after quenching and tempering, and uneven performance of an upsetting end.

In view of the shortcomings and defects in the prior art, it is expected to obtain a high-strength and high-toughness bainite geological drilling pipe, which has low production cost, and good strength-toughness matching, can obtain a level of the Cr—Mo steel grade subjected to quenching and tempering heat treatment without the need for quenching and tempering heat treatment, and has good performance of solid tensile and torque resistance.

SUMMARY

One of objectives of the present disclosure is to provide a bainite geological drilling pipe, which has low production cost, and good strength-toughness, can obtain a level of a Cr—Mo steel grade subjected to quenching and tempering heat treatment without the need for quenching and tempering heat treatment, and has good performance of solid tensile and torque resistance. The bainite geological drilling pipe can be effectively applied to the geological drilling industry, is conducive to promoting green and efficient development of the geological drilling industry, and has a very broad application prospect.

In order to achieve the above objectives, the present disclosure provides a bainite geological drilling pipe, comprising the following chemical elements in percentage by mass: 0.14-0.22% of C, 0.2-0.55% of Si, 2.1-2.9% of Mn, 0.01-0.04% of Nb, 0.015-0.04% of Al, 0.001-0.005% of B, 0<N≤0.007%, with the balance being Fe and inevitable impurities; and a content ratio of Al to N is Al/N≥3.

In an embodiment, the bainite geological drilling pipe comprises the following chemical elements in percentage by mass:

0.14-0.22% of C, 0.2-0.55% of Si, 2.1-2.9% of Mn, 0.01-0.04% of Nb, 0.015-0.04% of Al, 0.001-0.005% of B, 0<N≤0.007%, with the balance being Fe and inevitable impurities, wherein Al/N≥3; and the bainite geological drilling pipe does not comprise elements Cr, Mo and W.

In the above technical solution of the present disclosure, by adopting a reasonable chemical composition design, that is, by comprising medium to high content of Mn, and/or chemical composition without Cr, Mo, W and other noble metal elements, not only alloy cost is reduced, but also a phase transformation point of bainite is obviously reduced through a dragging effect of the element Mn on element diffusion at a phase transformation interface, so that structure refinement is realized, and the strength and toughness of products are improved.

In addition, an element B is further added into the chemical composition of the bainite geological drilling pipe of the present disclosure. Composite addition of the elements B and Mn further improves air cooling hardenability, and ensures formation of a stable granular bainite structure. At the same time, the element B may further strengthen grain boundaries, prevent excessive precipitation of MA island, and improve the toughness of materials.

In the bainite geological drilling pipe of the present disclosure, the design principle of each chemical element is specifically described as follows.

C: In the bainite geological drilling pipe of the present disclosure, the element C is an important element that ensures the strength of a pipe. The bainite structure may be stabilized and the air cooling hardenability of the materials is effectively improved after adding the element C. When the content of the element C in steel is too low, the bainite structure may be unstable, and the strength and toughness of the materials may become worse. At the same time, it needs to be noted that the content of the element C in the steel should not be too high. When the content of the element C in the steel is too high, the toughness and plasticity of the steel may be decreased. Therefore, in the bainite geological drilling pipe of the present disclosure, the mass percentage content of the element C is controlled to be between 0.14% and 0.22%.

Si: In the bainite geological drilling pipe of the present disclosure, the element Si is both a ferrite forming element and a deoxidizing element. The element Si may improve the purity of molten steel while promoting the formation of ferrite in the structure, and inhibiting the precipitation of carbides. However, it needs to be noted that when the content of the element Si in the steel is too low, it does not have the corresponding effect mentioned above, and when the content of the element Si in the steel exceeds 0.55%, there is no improvement on the structure. Therefore, in the bainite geological drilling pipe of the present disclosure, the mass percentage content of the element Si is controlled to be between 0.2% and 0.55%.

Mn: In the bainite geological drilling pipe of the present disclosure, Mn is an important element that improves the air cooling hardenability of the materials. Compared with the elements such as Mo, Cr and W, the element Mn is very cheap and easy to obtain. Compared with other elements, the element Mn may obviously reduce a transformation point of the bainite structure, so that the structure is refined, and the strength and toughness are improved. When the content of the element Mn in the steel is lower than 2.1%, an upper bainite structure is formed due to the decrease of hardenability, which will lead to poor toughness of the materials. When the content of the element Mn in the steel is higher than 2.9%, severe segregation of Mn may be caused, which will make the toughness of the materials worse and make the welding performance worse at the same time. Based on this, in the bainite geological drilling pipe of the present disclosure, the mass percentage content of Mn is controlled to be between 2.1% and 2.9%.

Nb: In the bainite geological drilling pipe of the present disclosure, the element Nb may be combined with the element C to form a carbide of Nb, inhibiting the growth of grains, so that the granular bainite structure is refined, and the strength of the materials is improved. At the same time, Nb can further inhibit the precipitation of proeutectoid ferrite and upper bainite, so as to obtain a stable granular structure at a lower cooling rate, refining the size of the MA island, and improving the toughness of the materials. Therefore, in the bainite geological drilling pipe of the present disclosure, the mass percentage content of the element Nb is controlled to be between 0.01% and 0.04%.

Al: In the bainite geological drilling pipe of the present disclosure, the element Al is a good deoxidizing element. However, it needs to be noted that the content of the element Al in the steel should not be too high, and adding too much element Al may be prone to causing alumina inclusions. Therefore, it is necessary to increase a specific gravity of acid soluble aluminum in total aluminum as much as possible, and feed an appropriate amount of Al wire after vacuum degassing. Therefore, in the bainite geological drilling pipe of the present disclosure, the mass percentage content of the element Al is controlled to be between 0.015% and 0.04%.

B: In the bainite geological drilling pipe of the present disclosure, the element B can effectively increase the hardenability of the materials. Composite addition of the elements B and Mn can further improve the air cooling hardenability, and ensure formation of a stable granular bainite structure in steel. In addition, the element B may further strengthen grain boundaries, inhibit formation of the MA island, and improve the strength and toughness matching of the materials. When the content of the element B in the steel is smaller than 0.001%, its effect is not obvious. When the content of the element B in the steel is too high, for example, higher than 0.005%, it is difficult to accurately control a steelmaking process. Therefore, in the bainite geological drilling pipe of the present disclosure, the mass percentage content of the element B is controlled to be between 0.001% and 0.005%.

N: In the bainite geological drilling pipe of the present disclosure, the element N may be matched with the element Al in the steel to form a carbonitride. Therefore, while controlling the mass percentage content of a single chemical element, it is necessary to control the mass percentage content of the elements Al and N to realize Al/N≥3, so that the content of acid soluble aluminum in the steel is ensured, the element Al in the steel may be fully combined with the element N, thereby preventing the element N from being combined with the element B to form a brittle low-melting-point phase, so that an improvement effect of the element B on the hardenability of the steel is ensured, and embrittlement of the grain boundaries is prevented. Based on this, in the bainite geological drilling pipe of the present disclosure, the mass percentage content of the element N is controlled to be 0<N≤0.007%.

In an embodiment, in the bainite geological drilling pipe of the present disclosure, in the inevitable impurities, S≤0.01%, and P≤0.006%.

In the above technical solution, P and S are both inevitable impurity elements in the steel. If technical conditions permit, in order to obtain the bainite geological drilling pipe with better performance and quality, the content of impurity elements in the steel should be reduced as much as possible.

In the present disclosure, excessive content of the element P in the steel may cause segregation and embrittlement of the grain boundaries, thereby seriously deteriorating the toughness of the materials. Moreover, when the content of the element S in the steel is too high, it may lead to an increase in the content of inclusions in the steel, which is unconducive to the low-temperature toughness of the materials. Therefore, if the technical conditions permit, the content of the elements P and S in the steel should be reduced as much as possible.

In an embodiment, a main body of a microstructure of the bainite geological drilling pipe is granular bainite, a phase proportion of the granular bainite is 95% or more, and a size of the granular bainite is 4-10 μm.

In an embodiment, the microstructure of the bainite geological drilling pipe further comprises an austenite with a phase proportion of 3-5%.

In an embodiment, a wall thickness of the bainite geological drilling pipe is 12-30 mm.

In an embodiment, the bainite geological drilling pipe may achieve the following properties without the need for quenching and tempering heat treatment: yield strength is greater than or equal to 750 MPa, tensile strength is greater than or equal to 1100 MPa, hardness is greater than or equal to 35 HRC, toughness is greater than or equal to 60 J, and residual stress is smaller than or equal to 40 MPa.

Another objective of the present disclosure is to provide a manufacturing method for a bainite geological drilling pipe. The manufacturing method has simple steps. The bainite geological drilling pipe obtained by the manufacturing method has good strength and toughness, and can obtain a quenching and tempering level of a Cr—Mo steel grade without the need for quenching and tempering heat treatment. The bainite geological drilling pipe obtained by the manufacturing method has the yield strength being greater than or equal to 750 MPa, the tensile strength being greater than or equal to 1100 MPa, the hardness being greater than or equal to 35 HRC, the toughness being greater than or equal to 60 J, and the residual stress being smaller than or equal to 40 MPa, and has good performance of solid tensile and torque resistance. The bainite geological drilling pipe obtained by the manufacturing method may be effectively applied to the geological drilling industry, promotes the green and efficient development of the geological drilling industry, and has a very broad application prospect.

In order to achieve the above objective, the present disclosure provides a manufacturing method for a bainite geological drilling pipe, including the following steps:

(1) performing smelting and casting on molten steel to obtain a pipe blank;

(2) performing heating, piercing, continuous rolling and sizing on the pipe blank to obtain a pipe body; and (3) performing two-stage air cooling on the pipe body: in first-stage air cooling, performing air circular blowing cooling on an outer surface of the pipe body, a temperature before cooling is greater than or equal to Ar3+50° C., a cooling rate is 5-15° C./s, and cooling to a temperature range from Bs-100° C. to Bs-50° C.; in second-stage air cooling, performing natural air cooling on the pipe body, a cooling rate is 0.5-4° C./s; wherein Ar3 represents a ferrite precipitation temperature during cooling, and Bs represents a starting temperature of bainite phase transformation.

In the above technical solution of the present disclosure, the manufacturing method of the present disclosure has a short production process flow and low production cost, significantly improves economic benefit, has no need for performing subsequent heat treatment by users, and improves the processing efficiency of finished products and the stability of products quality are at the same time.

It needs to be noted that in above step (3), in the first-stage air cooling, performing air circular blowing cooling on the outer surface of the pipe body, controlling the temperature before cooling to be greater than or equal to Ar3+50° C., the cooling rate to be 5-15° C./s, to cool to the temperature range from Bs-100° C. to Bs-50° C., which can effectively avoid the phase transformation of the proeutectoid ferrite and upper bainite, increase a supercooling degree of the granular bainite formation, and refine the granular bainite structure.

In step (3) of the manufacturing method of the present disclosure, the pipe body after sizing is processed by two-stage air cooling. The use of air cooling high-hardenability composition design, matched with cooling in a wide range of a cooling speed, can make the pipe obtain the stable granular bainite structure, which is conducive to the stability of the structure and performance of a thick-wall steel pipe, and make the pipe obtain low residual stress. Through two-stage air cooling, the method of the present disclosure can effectively control the mutual cancellation of thermal stress and phase transformation stress in a cooling phase transformation process, thereby reducing the final residual stress and improving the deformation resistance of the steel pipe.

In an embodiment, in the manufacturing method of the present disclosure, in step (1), a superheat degree of the molten steel is lower than 30° C., and/or a pulling speed of continuous casting is 1.8-2.2 m/min.

In an embodiment, in the manufacturing method of the present disclosure, in step (2), the pipe blank obtained in step (1) is cooled and then heated in a heating furnace (such as an annular heating furnace), a heating temperature is 1240-1300° C., and a heating time is 3-6 h; then performing piercing, and a piercing temperature is 1180-1240° C.;

performing continuous rolling after piercing, and a continuous rolling temperature is 1000-1100° C.; and then performing sizing, and a sizing temperature ranges from Ac3+100° C. to Ac3+200° C., wherein Ac3 represents an austenitizing temperature.

Compared with the prior art, the manufacturing method for the bainite geological drilling pipe of the present disclosure has the following advantages and beneficial effects:

by reasonably optimizing and designing the chemical composition of the steel pipe and cooperating with the manufacturing process of the present disclosure, the high-strength and high-toughness bainite geological drilling pipe with good strength and toughness can be obtained. The bainite geological drilling pipe not only has good room-temperature mechanical performance, but also has low residual stress.

The bainite geological drilling pipe of the present disclosure has good strength and toughness, and can obtain the quenching and tempering level of the Cr—Mo steel grade without the need for quenching and tempering heat treatment, has the yield strength being greater than or equal to 750 MPa, the tensile strength being greater than or equal to 1100 MPa, the hardness being greater than or equal to 35 HRC, the toughness being greater than or equal to 60 J, and the residual stress being less than or equal to MPa, and has good performance of solid tensile and torque resistance.

The manufacturing method for the bainite geological drilling pipe of the present disclosure has a short process flow, greatly improves the economic benefit, has no need for performing subsequent heat treatment processes by the users, improves the processing efficiency of the finished products and the stability of the products quality at the same time, promotes the green and efficient development of the geological drilling industry, and has a very broad application prospect.

DETAILED DESCRIPTION

Figure 1:
FIG. 1 is a typical metallographic structural diagram of a bainite geological drilling pipe of Example 1 under a 500× microscope.

A bainite geological drilling pipe and a manufacturing method therefor of the present disclosure will be further explained and described below in conjunction with specific examples and accompanying drawings of the specification, however, the explanation and description do not constitute an improper limitation on the technical solution of the present disclosure.

Examples 1-6 and Comparative Examples 1-6

Bainite geological drilling pipes of Examples 1-6 and comparison steel pipes in Comparative Examples 1-5 are manufactured by the following steps:

(1) according to the chemical composition shown in Table 1, smelting and casting are performed using an electric furnace or a converter to obtain a pipe blank: a blending scheme of scrap steel and blast furnace molten iron is adopted, and the proportion of the molten iron is 50-60%, molten steel is smelted through the electric furnace, refined outside the furnace, vacuum degassed and stirred with argon gas, and then is subjected to inclusion denaturation through Ca treatment, reducing the content of 0 and H. An alloy is cast into a round blank, a overheat degree of the molten steel is controlled to be lower than 30° C. in a casting process, and a pulling speed of continuous casting is controlled to be 1.8-2.2 m/min, so as to reduce composition segregation.

(2) Heating, piercing, hot rolling and sizing: the pipe blank is cooled and then heated in an annular heating furnace, a heating temperature is controlled to be 1240-1300° C., and a heating time is controlled to be 3-6 h; then performing piercing, and a piercing temperature is controlled to be 1180-1240° C.; performing continuous rolling after piercing, and a continuous rolling temperature is controlled to be 1000-1100° C.; and then performing sizing, and a sizing temperature is controlled to range from Ac3+100° C. to Ac3+200° C., wherein Ac3 represents an austenitizing temperature.

(3) Two-stage air cooling: performing two-stage air cooling on a pipe body after sizing, in first-stage air cooling, air circular blowing cooling is performed on an outer surface of the pipe body, a temperature before cooling is greater than or equal to Ar3+50° C., a cooling rate is 5-15° C./s, and cooling to a temperature range from Bs-100° C. to Bs-50° C.; in second-stage air cooling, performing natural air cooling on the pipe body, a cooling rate is 0.5-4° C./s, wherein Ar3 represents a ferrite precipitation temperature during cooling, and Bs represents a starting temperature of bainite phase transformation.

The comparison steel pipe in Comparative Example 6 is manufactured by the same method as Example 1, with the only difference that the pipe body is not cooled by two-stage air cooling after sizing, but only by natural air cooling.

The chemical composition design and related processes of the bainite geological drilling pipes in Examples 1-6 meet the design specification requirements of the present disclosure. There are parameters in the chemical composition design or related processes of the comparison steel pipes in Comparative Examples 1-6 that do not meet the design specification requirements of the present disclosure.

It needs to be noted that content of an element C in the comparison steel pipe in Comparative Example 1 is less than a design range; content of an element Mn in the comparison steel pipe in Comparative Example 2 is less than the design range; content of an element Nb in the comparison steel pipe in Comparative Example 3 is less than the design range; the content of the element C in the comparison steel pipe in Comparative Example 4 is greater than the design range; a value of Al/N in the comparison steel pipe in Comparative Example 5 does not meet the design range; and although the chemical composition design of the comparison steel pipe in Comparative Example 6 meets the design range of the present disclosure, it does not use two-stage air cooling after sizing in the manufacturing process, but only perform natural air cooling.

Table 1 lists a mass percentage ratio of each chemical element of the bainite geological drilling pipes of Examples 1-6 and the comparison steel pipes of Comparative Examples 1-6.

TABLE 1

(The balance is Fe and other inevitable impurities except for P and S)

| Number | C (wt. %) | Si (wt. %) | Mn (wt. %) | S (wt. %) | P (wt. %) | Nb (wt. %) | Al (wt. %) | N (wt. %) | B (wt. %) | Al/N |
|---|---|---|---|---|---|---|---|---|---|---|
| Example 1 | 0.14 | 0.25 | 2.7 | 0.008 | 0.001 | 0.02 | 0.015 | 0.004 | 0.002 | 3.75 |
| Example 2 | 0.16 | 0.5 | 2.55 | 0.007 | 0.002 | 0.025 | 0.025 | 0.006 | 0.0045 | 4.17 |
| Example 3 | 0.17 | 0.55 | 2.3 | 0.006 | 0.003 | 0.03 | 0.038 | 0.007 | 0.003 | 5.43 |
| Example 4 | 0.22 | 0.5 | 2.1 | 0.005 | 0.004 | 0.01 | 0.02 | 0.006 | 0.001 | 3.33 |
| Example 5 | 0.15 | 0.35 | 2.9 | 0.005 | 0.0035 | 0.035 | 0.03 | 0.005 | 0.0035 | 6.00 |
| Example 6 | 0.16 | 0.45 | 2.2 | 0.001 | 0.006 | 0.03 | 0.025 | 0.005 | 0.0025 | 5.00 |
| Comparative Example 1 | 0.08 | 0.55 | 2.55 | 0.01 | 0.0025 | 0.02 | 0.02 | 0.004 | 0.0025 | 5.00 |
| Comparative Example 2 | 0.15 | 0.35 | 1.9 | 0.006 | 0.001 | 0.02 | 0.025 | 0.0025 | 0.002 | 10.0 |
| Comparative Example 3 | 0.15 | 0.55 | 2.45 | 0.004 | 0.002 | 0.003 | 0.03 | 0.005 | 0.0025 | 6.00 |
| Comparative Example 4 | 0.28 | 0.55 | 2.45 | 0.005 | 0.002 | 0.01 | 0.02 | 0.004 | 0.002 | 5.00 |
| Comparative Example 5 | 0.15 | 0.45 | 2.36 | 0.005 | 0.001 | 0.02 | 0.015 | 0.006 | 0.001 | 2.50 |
| Comparative Example 6 | 0.15 | 0.5 | 2.35 | 0.002 | 0.002 | 0.025 | 0.015 | 0.005 | 0.0015 | 3.00 |

Table 2-1 and Table 2-2 list specific process parameters of the bainite geological drilling pipes of Examples 1-6 and comparison steel pipes of Comparative Examples 1-6 in the above process steps.

TABLE 2-1

| | Step (1) | | Step (2) | | | | |
|---|---|---|---|---|---|---|---|
| Number | Overheat degree of molten steel (° C.) | Pulling speed of continuous casting (m/min) | Heating temperature (° C.) | Heating time (h) | Piercing temperature (° C.) | Continuous rolling temperature (° C.) | Sizing temperature (° C.) |
| Example 1 | 25 | 2 | 1260 | 4 | 1180 | 1010 | AC3 + 100° C. |
| Example 2 | 15 | 2.1 | 1240 | 3 | 1210 | 1010 | AC3 + 150° C. |
| Example 3 | 25 | 2.1 | 1250 | 5 | 1210 | 1020 | AC3 + 200° C. |
| Example 4 | 20 | 2 | 1260 | 6 | 1180 | 1030 | AC3 + 120° C. |
| Example 5 | 15 | 2.2 | 1280 | 4 | 1230 | 1060 | AC3 + 140° C. |

TABLE 2-1-continued

| | Step (1) | | Step (2) | | | | |
|---|---|---|---|---|---|---|---|
| Number | Overheat degree of molten steel (° C.) | Pulling speed of continuous casting (m/min) | Heating temperature (° C.) | Heating time (h) | Piercing temperature (° C.) | Continuous rolling temperature (° C.) | Sizing temperature (° C.) |
| Example 6 | 20 | 1.85 | 1270 | 5 | 1220 | 1095 | AC3 + 120° C. |
| Comparative Example 1 | 20 | 2.1 | 1260 | 4 | 1190 | 1060 | AC3 + 160° C. |
| Comparative Example 2 | 20 | 2.1 | 1270 | 4 | 1210 | 1050 | AC3 + 170° C. |
| Comparative Example 3 | 20 | 1.8 | 1290 | 5 | 1220 | 1060 | AC3 + 190° C. |
| Comparative Example 4 | 25 | 1.9 | 1260 | 5 | 1210 | 1030 | AC3 + 120° C. |
| Comparative Example 5 | 22 | 2 | 1270 | 6 | 1230 | 1030 | AC3 + 140° C. |
| Comparative Example 6 | 18 | 2.1 | 1250 | 3 | 1210 | 1020 | AC3 + 110° C. |

TABLE 2-2

| | Step (3) | | | |
|---|---|---|---|---|
| Number | Temperature before cooling (° C.) | Cooling rate in first-stage (° C./s) | Final cooling temperature in first-stage (° C.) | Cooling rate in second-stage (° C./s) |
| Example 1 | Ar3 + 50 | 10 | Bs − 80 | 2 |
| Example 2 | Ar3 + 100 | 5 | Bs − 50 | 1 |
| Example 3 | Ar3 + 170 | 8 | Bs − 90 | 0.6 |
| Example 4 | Ar3 + 190 | 12 | Bs − 100 | 3.5 |
| Example 5 | Ar3 + 170 | 13 | Bs − 60 | 2.5 |
| Example 6 | Ar3 + 150 | 10 | Bs − 60 | 2.5 |
| Comparative Example 1 | Ar3 + 160 | 8 | Bs − 70 | 3.8 |
| Comparative Example 2 | Ar3 + 180 | 15 | Bs − 80 | 2 |
| Comparative Example 3 | Ar3 + 190 | 8 | Bs − 75 | 1 |
| Comparative Example 4 | Ar3 + 200 | 10 | Bs − 65 | 2.6 |
| Comparative Example 5 | Ar3 + 80 | 9 | Bs − 85 | 1 |
| Comparative Example 6 | Ar3 + 100 | — | — | 2.5 |

The obtained bainite geological drilling pipes of Examples 1-6 and the comparison steel pipes of Comparative Examples 1-6 are sampled respectively, and mechanical performance of finished pipes of each Examples and Comparative examples are tested at a room temperature respectively. Mechanical performance test results of each Example and Comparative example are listed in Table 3 respectively.

The relevant performance testing method is described as follows:

mechanical performance test: detection conditions: a temperature is 23° C., a humidity is 56%, a tensile rate is 3 mm/min before yielding and 28 mm/min after yielding, and it is tested according to conditions of GB/T 228.1-2010 metallic material tensile testing Part 1: Tensile Testing at Room Temperature.

Table 3 lists mechanical performance testing results of the bainite geological drilling pipes of Examples 1-6 and the comparison steel pipes of Comparative examples 1-6.

TABLE 3

| Number | Yield strength (MPa) | Tensile strength (MPa) | Room-temperature longitudinal impact toughness (J) | Hardness (HRC) | Residual stress (MPa) |
|---|---|---|---|---|---|
| Example 1 | 780 | 1120 | 65 | 35 | 35 |
| Example 2 | 820 | 1150 | 70 | 36 | 16 |
| Example 3 | 860 | 1150 | 88 | 35.5 | 13 |
| Example 4 | 890 | 1180 | 95 | 37 | 0 |
| Example 5 | 900 | 1200 | 85 | 40 | 25 |
| Example 6 | 850 | 1140 | 100 | 38 | 22 |
| Comparative Example 1 | 650 | 850 | 20 | 28 | 22 |
| Comparative Example 2 | 635 | 865 | 15 | 26 | 23 |
| Comparative Example 3 | 685 | 915 | 55 | 29 | 26 |
| Comparative Example 4 | 990 | 1290 | 12 | 44 | 45 |
| Comparative Example 5 | 700 | 1050 | 16 | 30 | 50 |
| Comparative Example 6 | 760 | 1100 | 30 | 33 | 95 |

It can be seen from Table 3 that compared with the comparison steel pipes of Comparative Examples 1-6, the bainite geological drilling pipes of Examples 1-6 of the present disclosure have very excellent mechanical performance and good strength and toughness, their yield strength is between 780 MPa and 900 MPa, the tensile strength is between 1120 MPa and 1200 MPa, the hardness is between 35 HRC and 40 HRC, the residual stress is between 0 and 35 MPa, and the room-temperature longitudinal impact toughness is between 65 J and 100 J.

Correspondingly, the comprehensive performance of the comparison steel pipes of Comparative Examples 1-5 are obviously inferior to the bainite geological drilling pipes of Examples 1-6. For the comparison steel pipes of Comparative Examples 1-2, the yield strength and tensile strength are quite poor, and the room-temperature longitudinal impact toughness and hardness are poor; For the comparison steel pipe of Comparative Example 3, the yield strength and tensile strength are quite poor, the hardness is poor, and the toughness does not meet the requirements either; For the comparison steel pipe in Comparative Example 4, although the yield strength, tensile strength and hardness are high, the room-temperature longitudinal impact toughness is poor, and the residual stress is high; For the comparison steel pipe in Comparative Example 5, the yield strength, room-temperature longitudinal impact toughness and hardness are poor, and the residual stress is high.

For the comparison steel pipe in Comparative Example 6, the chemical composition design meets the design specification requirements of the present disclosure, but two-stage air cooling is not adopted after sizing during the process, therefore, the residual stress is quite high, and the room-temperature longitudinal impact toughness is poor.

To sum up, it can be seen that the bainite geological drilling pipes of Examples 1-6 have good strength and toughness, and can obtain the quenching and tempering level of the Cr—Mo steel grade without the need for quenching and tempering heat treatment, has the yield strength being greater than or equal to 750 MPa, the tensile strength being greater than or equal to 1100 MPa, the hardness being greater than or equal to HRC, the toughness being greater than or equal to 60 J, the residual stress being less than or equal to 40 MPa, and has good solid tensile and torque resistance, short production process flow, improves the economic benefit greatly, has no need for performing subsequent heat treatment by users, improves the processing efficiency of the finished products and the stability of the products quality at the same time, promotes the green and efficient development of the geological drilling industry, and has a very broad application prospect.

FIG. 1 is a typical metallographic structural diagram of a bainite geological drilling pipe of Example 1 under a 500× microscope.

Figure 2:
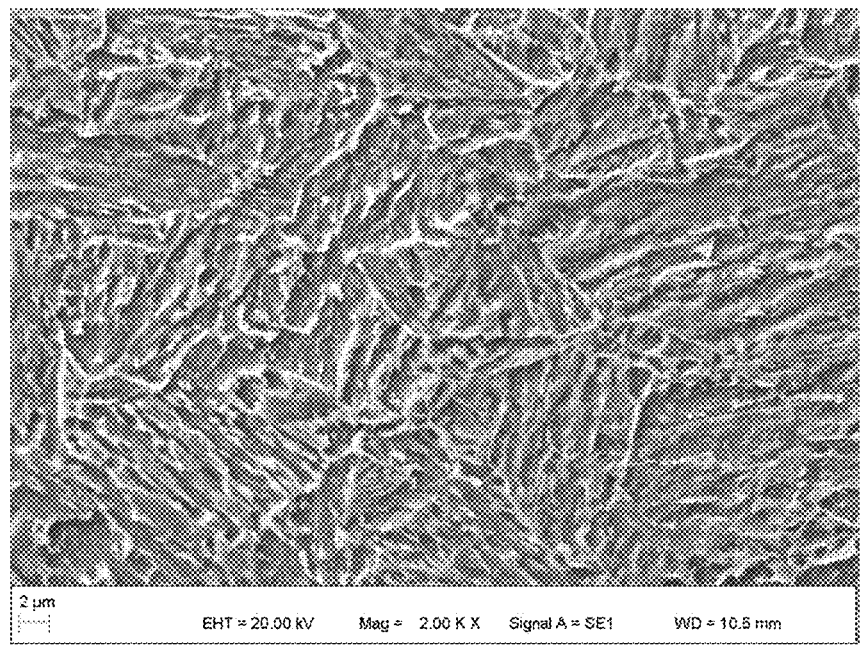
FIG. 2 is a microstructure picture of a bainite geological drilling pipe of Example 1 under a 2000× scanning electron microscope.

FIG. 2 is a microstructure picture of a bainite geological drilling pipe of Example 1 under a 2000× scanning electron microscope.

As shown in FIG. 1 and FIG. 2, a main body of the bainite geological drilling pipe of Example 1 is granular bainite, with a structure of a homogeneous granular bainite structure, and with a size of 4-10 µm, and the bainite geological drilling pipe comprises a small amount of austenite with a phase proportion of 3-5%.

The morphology after residual stress of the bainite geological drilling pipe of Example 1 can be tested using a slit method. The residual stress of Example 1 is small, and a pipe body after being slit is basically closed, which can effectively prevent deformation in subsequent processing and use.

It needs to be noted that the combination of various technical features in this case is not limited to the combination described in the claims or the combination described in specific embodiments of this case. All technical features described in the present disclosure can be freely combined or bonded in any way, unless there is a conflict between them.

It needs also to be noted that the Examples listed above are only the specific embodiments of the present disclosure. Obviously, the present disclosure is not limited to the above Examples, and similar variations or deformations made accordingly can be easily thought of or directly obtained from the content of the present disclosure by those skilled in the art, and all should fall within the protection scope of the present disclosure.

The invention claimed is:

1. A bainite geological drilling pipe, comprising the following chemical elements in percentage by mass: 0.14-0.22% of C, 0.2-0.55% of Si, 2.1-2.9% of Mn, 0.01-0.04% of Nb, 0.015-0.04% of Al, 0.001-0.005% of B, 0<N≤0.007%, with the balance being Fe and inevitable impurities, wherein
a content ratio of Al to N is Al/N≥3,
wherein the bainite geological drilling pipe achieves the following properties without the need for quenching and tempering heat treatment: yield strength is greater than or equal to 750 MPa, tensile strength is greater than or equal to 1100 MPa, hardness is greater than or equal to 35 HRC, toughness is greater than or equal to 60 J, and residual stress is less than or equal to 40 MPa.

2. The bainite geological drilling pipe of claim 1, comprising the following chemical elements in percentage by mass:
0.14-0.22% of C, 0.2-0.55% of Si, 2.1-2.9% of Mn, 0.01-0.04% of Nb, 0.015-0.04% of Al, 0.001-0.005% of B, 0<N≤0.007%, with the balance being Fe and the inevitable impurities, wherein
the content ratio of Al to N is Al/N≥3;
the bainite geological drilling pipe does not comprise elements Cr, Mo and W.

3. The bainite geological drilling pipe of claim 2, wherein in the inevitable impurities, S≤0.01%, and P≤0.006%.

4. The bainite geological drilling pipe of claim 2, wherein a main body of a microstructure of the bainite geological drilling pipe is granular bainite, a phase proportion of the granular bainite is 95% or more, and a size of the granular bainite is 4-10 µm.

5. The bainite geological drilling pipe of claim 2, wherein a microstructure of the bainite geological drilling pipe further comprises an austenite with a phase proportion of 3-5%.

6. The bainite geological drilling pipe of claim 2, wherein a wall thickness of the bainite geological drilling pipe is 12-30 mm.

7. The bainite geological drilling pipe of claim 1, wherein in the inevitable impurities, S≤0.01%, and P≤0.006%.

8. The bainite geological drilling pipe of claim 1, wherein a main body of a microstructure of the bainite geological drilling pipe is granular bainite, a phase proportion of the granular bainite is 95% or more, and a size of the granular bainite is 4-10 µm.

9. The bainite geological drilling pipe of claim 1, wherein a microstructure of the bainite geological drilling pipe further comprises an austenite with a phase proportion of 3-5%.

10. The bainite geological drilling pipe of claim 1, wherein a wall thickness of the bainite geological drilling pipe is 12-30 mm.

11. A manufacturing method for the bainite geological drilling pipe of claim 1, comprising the following steps:
(1) performing smelting and casting on molten steel to obtain a pipe blank;
(2) performing heating, piercing, continuous rolling and sizing on the pipe blank to obtain a pipe body; and
(3) performing two-stage air cooling on the pipe body: in first-stage air cooling, performing air circular blowing cooling on an outer surface of the pipe body, a temperature before cooling is greater than or equal to Ar3+50° C., a cooling rate is 5-15° C./s, and cooling to a temperature range from Bs−100° C. to Bs−50° C.; in second-stage air cooling, performing natural air cooling on the pipe body, a cooling rate is 0.5-4° C./s; wherein Ar3 represents a ferrite precipitation temperature during cooling, and Bs represents a starting temperature of bainite phase transformation.

12. The method of claim 5, wherein in step (1), a superheat degree of the molten steel is lower than 30° C., and/or a pulling rate of continuous casting is 1.8-2.2 m/min.

13. The method of claim 5, wherein in step (2), the pipe blank obtained in step (1) is cooled and then heated in a heating furnace, a heating temperature is 1240-1300° C., and a heating time is 3-6 h; then performing piercing, and a piercing temperature is 1180-1240° C.; performing continuous rolling after piercing, and a continuous rolling temperature is 1000-1100° C.; and then performing sizing, and a sizing temperature ranges from Ac3+100° C. to Ac3+200° C., wherein Ac3 represents an austenitizing temperature.

\* \* \* \* \*